(12) United States Patent
Stinebring et al.

(10) Patent No.: US 9,616,914 B2
(45) Date of Patent: Apr. 11, 2017

(54) TELESCOPE AND ADAPTIVE ENERGY ABSORPTION SYSTEM

(71) Applicant: Steering Solutions IP Holding Corporation, Saginaw, MI (US)

(72) Inventors: Scott A. Stinebring, Auburn, MI (US); Robert D. Maida, Pinconning, MI (US); Nicholas M. Messing, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/928,155

(22) Filed: Oct. 30, 2015

(65) Prior Publication Data

US 2016/0046318 A1 Feb. 18, 2016

Related U.S. Application Data

(63) Continuation-in-part of application No. 14/624,687, filed on Feb. 18, 2015.

(60) Provisional application No. 61/942,217, filed on Feb. 20, 2014.

(51) Int. Cl.
*B62D 1/19* (2006.01)
*B62D 1/181* (2006.01)

(52) U.S. Cl.
CPC .............. *B62D 1/181* (2013.01); *B62D 1/195* (2013.01)

(58) Field of Classification Search
CPC ......... B62D 1/181; B62D 1/192; B62D 1/195
See application file for complete search history.

(56) References Cited

U.S. PATENT DOCUMENTS

| | | | |
|---|---|---|---|
| 3,501,993 A | 3/1970 | Swenson | |
| 5,520,416 A * | 5/1996 | Singer, III | B62D 1/181 280/775 |
| 5,722,299 A | 3/1998 | Yamamoto et al. | |
| 5,848,557 A | 12/1998 | Sugiki et al. | |
| 6,142,485 A | 11/2000 | Muller et al. | |
| 6,328,343 B1 | 12/2001 | Hosie et al. | |
| 7,516,991 B1 | 4/2009 | Cheng | |
| 8,935,968 B2 | 1/2015 | Sugiura | |
| 9,022,426 B2 | 5/2015 | Sakata | |
| 9,022,427 B2 | 5/2015 | Schnitzer | |
| 9,428,213 B2 * | 8/2016 | Tinnin | B62D 1/195 |
| 2003/0185648 A1 | 10/2003 | Blaess | |
| 2003/0209897 A1 | 11/2003 | Manwaring et al. | |
| 2003/0227163 A1 | 12/2003 | Murakami et al. | |
| 2004/0200306 A1 | 10/2004 | Schafer | |

(Continued)

FOREIGN PATENT DOCUMENTS

JP 2011057020 A 3/2011

*Primary Examiner* — Faye M Fleming
(74) *Attorney, Agent, or Firm* — Cantor Colburn LLP

(57) ABSTRACT

A steering column assembly includes an upper jacket assembly received within a lower jacket assembly, and an energy absorption assembly. The energy absorption assembly includes a first energy absorption strap and a second energy absorption strap. The first energy absorption strap has a first portion defining an opening configured to receive a pin of an actuator and a second portion coupled to the upper jacket assembly. The second energy absorption strap has a third portion coupled to a telescope drive bracket and a fourth portion coupled to the upper jacket assembly.

20 Claims, 4 Drawing Sheets

(56) References Cited

U.S. PATENT DOCUMENTS

| | | |
|---|---|---|
| 2007/0137379 A1 | 6/2007 | Sanji et al. |
| 2007/0194563 A1 | 8/2007 | Menjak et al. |
| 2008/0106086 A1 | 5/2008 | Shimoda |
| 2009/0200783 A1 | 8/2009 | Cymbal |
| 2012/0125139 A1* | 5/2012 | Tinnin ............... B62D 1/195 74/493 |
| 2012/0125140 A1* | 5/2012 | Ridgway ............ B62D 1/195 74/493 |
| 2013/0205933 A1 | 8/2013 | Moriyama |
| 2013/0233117 A1* | 9/2013 | Read .................. B62D 1/181 74/493 |
| 2014/0109713 A1 | 4/2014 | Bodtker |
| 2014/0109714 A1 | 4/2014 | Bodtker |
| 2014/0137694 A1 | 5/2014 | Sugiura |
| 2014/0147197 A1 | 5/2014 | Yoshida et al. |
| 2015/0028574 A1 | 1/2015 | Meyer et al. |
| 2015/0069747 A1* | 3/2015 | Sharman ............. B62D 1/195 280/777 |
| 2015/0166093 A1 | 6/2015 | Moriyama et al. |
| 2015/0232117 A1* | 8/2015 | Stinebring ........... B62D 1/195 74/493 |
| 2015/0239490 A1 | 8/2015 | Sakata |
| 2015/0251683 A1 | 9/2015 | Caverly et al. |

\* cited by examiner

TELESCOPE AND ADAPTIVE ENERGY ABSORPTION SYSTEM

CROSS-REFERENCES TO RELATED APPLICATIONS

This application is a continuation-in-part of U.S. application Ser. No. 14/624,687 filed Feb. 18, 2015, which, in turn, claims the benefit of U.S. provisional application Ser. No. 61/942,217 filed Feb. 20, 2014, the disclosures of which are hereby incorporated in their entirety by reference herein.

BACKGROUND OF THE INVENTION

The present disclosure relates to a telescope and adaptive energy absorption system for a vehicle steering system.

Telescopically adjustable steering columns generally include a telescope actuator and column jacket having lower and upper jackets. The column jacket is longitudinally moveable and internally collapsible along a longitudinal axis between a "full out" position in which the column jacket is fully extended and a "full in" position in which the column jacket is fully retracted. This collapsibility is energy-absorbing (E/A) and may be beneficial during a vehicle impact event.

SUMMARY OF THE INVENTION

In at least one embodiment of the present disclosure, a steering column assembly includes a lower jacket assembly, an upper jacket assembly, a telescope actuator assembly, an actuator, and a first energy absorption strap. The lower jacket assembly extends along an axis of the steering column and may at least partially receive the upper jacket assembly. The telescope actuator assembly is configured to translate the upper jacket assembly relative to the lower jacket assembly and includes a telescope drive bracket and a telescope actuator. The telescope drive bracket is coupled to the upper jacket assembly and the telescope actuator is coupled to the lower jacket assembly and operatively connected to the telescope drive bracket. The actuator is disposed on the telescope drive bracket and includes a pin configured to be in an extended position during a collapse event due to a load exceeding a predetermined load and is configured to be in a refracted position during a collapse event due to a load not exceeding the predetermined load. The first energy absorption strap includes a first portion defining an opening configured to receive the pin and a second portion coupled to the upper jacket assembly. During the collapse event due to a load exceeding the predetermined load, the first energy absorption strap and the actuator are arranged such that while the upper jacket assembly moves relative to the lower jacket assembly and the pin is received within the opening.

In at least one embodiment of the present disclosure, a steering column assembly includes an upper jacket assembly received within the lower jacket, a telescope actuator assembly, and an energy absorption assembly. The telescope actuator assembly is configured to translate the upper jacket assembly relative to the lower jacket assembly and includes a telescope drive bracket and a telescope actuator. The telescope drive bracket is coupled to the upper jacket assembly. The telescope actuator is disposed on the lower jacket assembly and is operatively coupled to the telescope drive bracket by a lead screw. The energy absorption assembly includes a first energy absorption strap and a second energy absorption strap. The first energy absorption strap includes a first portion defining an opening configured to receive the pin of an actuator disposed on telescope drive bracket and a second portion coupled to the upper jacket assembly. The second energy absorption strap includes a third portion coupled to the telescope drive bracket and a fourth portion coupled to the upper jacket assembly.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Referring now to the Figures, where the invention will be described with reference to specific embodiments, without limiting same, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the invention.

Figure 1:
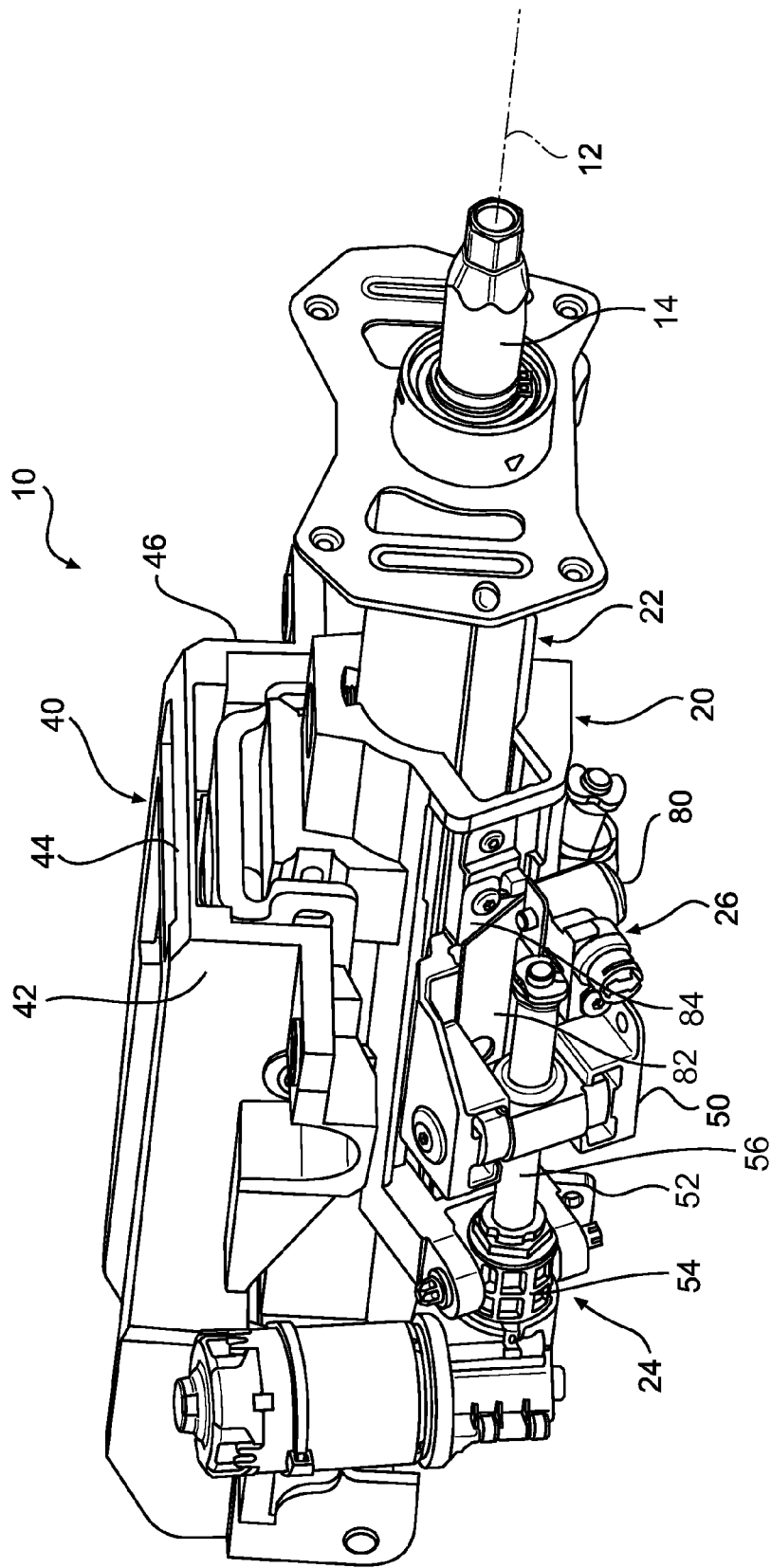
FIG. 1 is a perspective view of a steering column assembly in an extended position.
Figure 2:
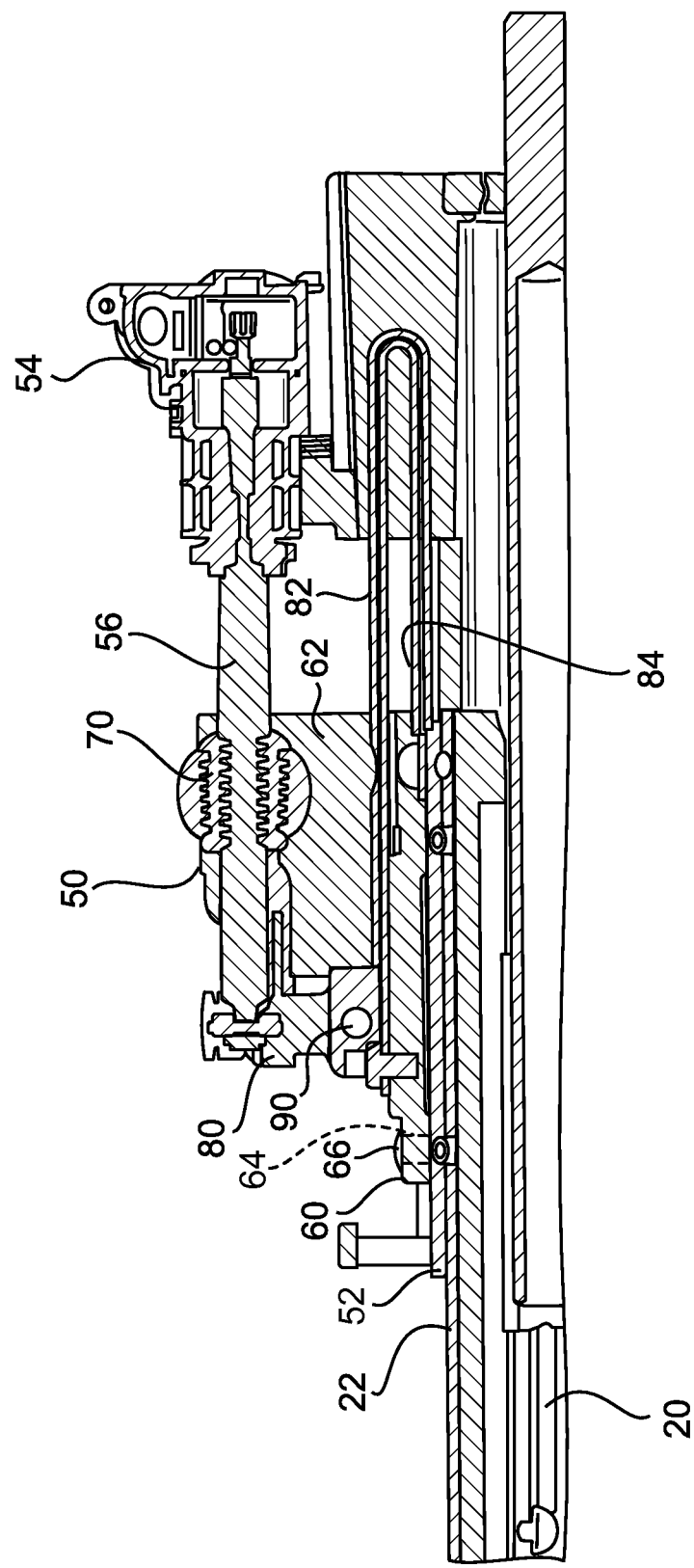
FIG. 2 is a partial cross-sectional view of the steering column assembly prior to a collapse event.

Referring to FIGS. 1 and 2, a steering column assembly 10 in an extended position prior to a collapse event is shown. The steering column assembly 10 extends along a steering column axis 12. The steering column assembly 10 is an adjustable telescopic steering column assembly. A steering shaft 14 extends through the steering column assembly 10 along the steering column axis 12. The steering column assembly 10 includes a lower jacket assembly 20, an upper jacket assembly 22, a telescope actuator assembly 24, and an energy absorption assembly 26.

The lower jacket assembly 20 extends along the steering column axis 12. The lower jacket assembly 20 defines an inner bore that slidably or telescopically receives at least a portion of the upper jacket assembly 22. The lower jacket assembly 20 is operatively connected to a vehicle structure by a mounting bracket 40. Throughout this specification, the term "attach," "attachment," "connected", "coupled," "coupling," "mount," or "mounting" shall be interpreted to mean that one structural component or element is in some manner connected to or contacts another element—either directly or indirectly through at least one intervening structural element—or is integrally formed with the other structural element. Accordingly, it should be appreciated that the lower jacket assembly 20 may be connected to the mounting bracket 40 in several different ways using at least one different structural element interconnecting the lower jacket assembly 20 and mounting bracket 40 to each other.

The mounting bracket 40 is configured as a rake bracket to adjust the pitch or rake of the lower jacket assembly 20 and the upper jacket assembly 22. The mounting bracket 40 includes a first plate 42, a top plate 44, and a second plate 46. The first plate 42 is disposed opposite the second plate 46. The top plate 44 extends between upper portions of the first plate 42 and the second plate 46.

The upper jacket assembly 22 extends longitudinally along the steering column axis 12. The upper jacket assembly 22 is telescopically or slidably received within the lower jacket assembly 20. The lower jacket assembly 20 and/or the upper jacket assembly 22 are extendable along the steering column axis 12 with respect to each other. The telescope actuator assembly 24 is configured to translate the upper jacket assembly 22 relative to the lower jacket assembly 20.

The telescope actuator assembly 24 includes a telescope drive bracket 50, a mounting plate 52, a telescope actuator 54, and a lead screw 56. The telescope drive bracket 50 is coupled to the upper jacket assembly 22 via the mounting plate 52 disposed between the telescope drive bracket 50 and the upper jacket assembly 22. The mounting plate 52 is mounted to the steering column assembly 10 by any appropriate method, such as fastening, welding, or other joining method.

The telescope drive bracket 50 extends generally away from the steering column axis 12. The telescope drive bracket 50 defines a base portion 60 disposed proximate the upper jacket assembly 22 and a body portion 62 extending away from the base portion 60. The base portion 60 defines a base slot 64 configured to receive a fastener 66 to couple the telescope drive bracket 50 to the upper jacket assembly 22.

The body portion 62 defines an opening or an aperture extending completely through the body portion 62. The aperture is disposed substantially parallel to the steering column axis 12. The body portion 62 includes a jackscrew nut 70 disposed within the aperture.

The telescope actuator 54 is spaced apart from the telescope drive bracket 50. The telescope actuator 54 is disposed on the lower jacket assembly 20. The telescope actuator 54 is operatively connected to the telescope drive bracket 50 via the lead screw 56. The lead screw 56 extends from the telescope actuator 54 through the aperture of the telescope drive bracket 50 and engages the jackscrew nut 70 to interconnect the telescope drive bracket 50 and the telescope actuator 54. The telescope actuator 54 imparts rotary motion to the lead screw 56 and the telescope drive bracket 50 converts the rotary motion into linear motion to translate the upper jacket assembly 22 along the steering column axis 12 relative to the lower jacket assembly 20. The telescope actuator 54 may be an electronic actuator, hydraulic actuator, pneumatic actuator, or the like.

Referring to FIGS. 1-4, the energy absorption assembly 26 extends between the lower jacket assembly 20 and the upper jacket assembly 22. The energy absorption assembly 26 translates with upper jacket assembly 22 during operation of the telescope actuator assembly 24 to adjust the position of the upper jacket assembly 22 relative to the lower jacket assembly 20. The energy absorption assembly 26 is configured to provide a drag load or force opposing stroking or translation of the upper jacket assembly 22 relative to the lower jacket assembly 20 to decelerate the steering column assembly 10 during a collapse event. The drag load or force opposing stroking of the upper jacket assembly 22 relative to the lower jacket assembly 20 is adaptive or variable based on the loads encountered during the collapse event and the configuration of the energy absorption assembly 26.

Figure 3:
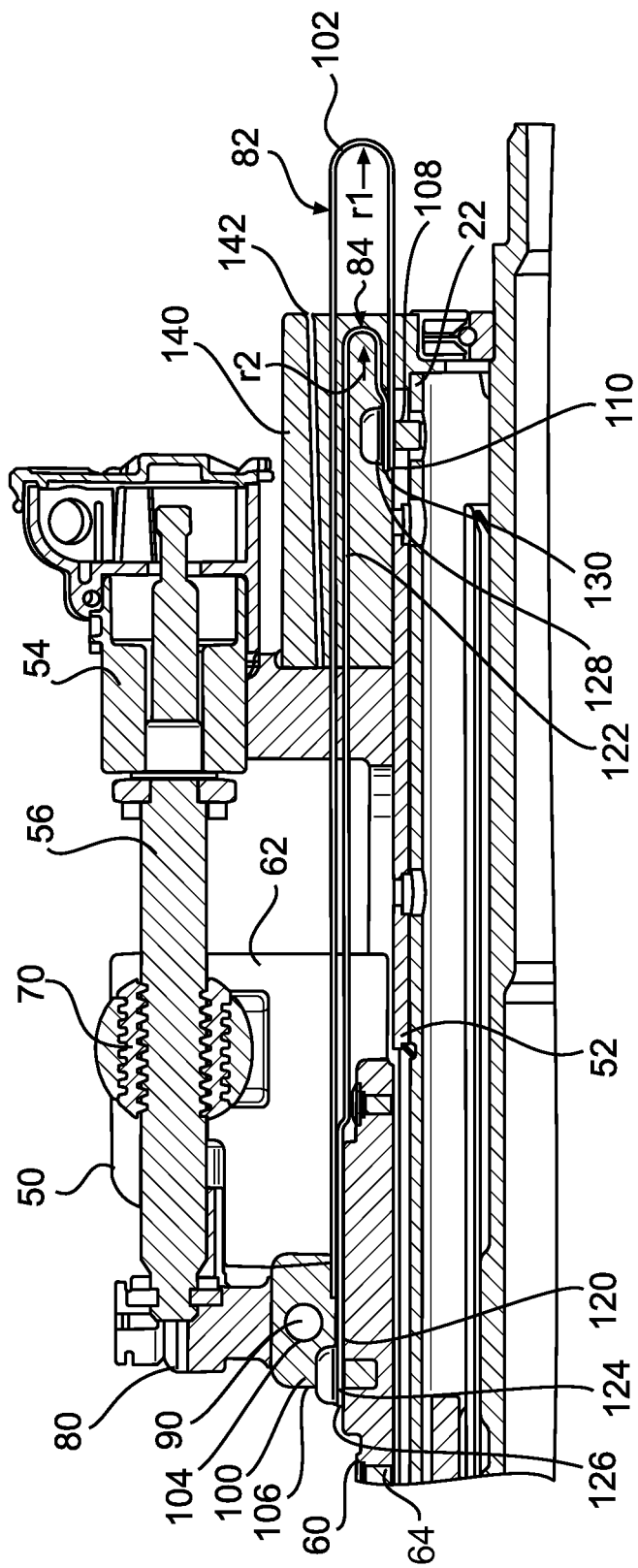
FIG. 3 is a partial cross-sectional view of the steering column assembly after a high-load collapse event.
Figure 4:
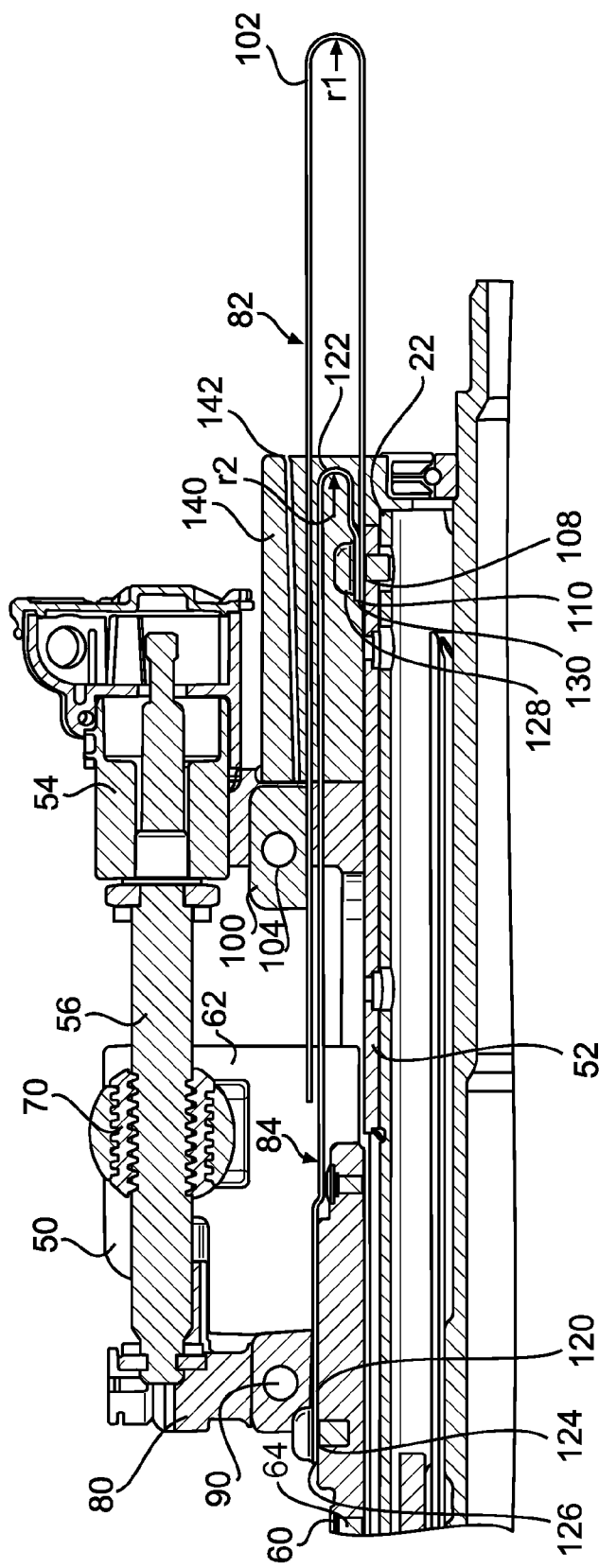
FIG. 4 is a partial cross-sectional view of the steering column assembly after a low-load collapse event.

The energy absorption assembly 26 includes an actuator 80, a first energy absorption strap 82, and a second energy absorption strap 84. The actuator 80 is disposed on the telescope drive bracket 50. The actuator 80 may be a solenoid, a retractable pin mechanism, or the like. The actuator 80 includes a pin 90 and a biasing member. The pin 90 is configured to be in the extended position during a high-load collapse event, as shown in FIG. 3. The pin 90 is configured to be in a retracted position during a low-load collapse event, as shown in FIG. 4. The biasing member is configured to bias the pin 90 towards an extended position. The biasing member may be a linear spring or other component configured or capable of biasing the pin 90 towards the extended position.

The first energy absorption strap 82 includes a first portion 100 and a second portion 102. The first portion 100 is disposed proximate a first end of the lower jacket assembly 20. The first portion 100 is disposed proximate the actuator 80. The first portion 100 defines an opening 104 configured to receive the pin 90 of the actuator 80. The opening 104 is disposed proximate a first end 106 of the first energy absorption strap 82.

The second portion 102 is disposed opposite the first portion 100. The second portion 102 has a first strap radius of curvature, r1. The second portion 102 defines a slot 108 that receives a fastener to couple the second portion 102 to the upper jacket assembly 22. The slot 108 is disposed proximate a second end 110 of the first energy absorption strap 82. The second end 110 of the first energy absorption strap 82 is disposed substantially parallel to but not coplanar with the first end 106 of the first energy absorption strap 82.

The second energy absorption strap 84 includes a third portion 120 and a fourth portion 122. The third portion 120 is disposed proximate the first portion 100 of the first energy absorption strap 82. The third portion 120 defines an opening 124 configured to receive a fastener to couple the second energy absorption strap 84 to the telescope drive bracket 50. The opening 124 is disposed proximate a third end 126 of the second energy absorption strap 84.

The fourth portion 122 is disposed opposite the third portion 120 and is disposed proximate the second end of the lower jacket assembly 20. The fourth portion 122 is disposed proximate the second portion 102 of the first energy absorption strap 82. The fourth portion 122 has a second strap radius of curvature, r2. The second strap radius of curvature, r2, is less than the first strap radius of curvature, r1, such that the first energy absorption strap 82 at least partially surrounds second energy absorption strap 84. The fourth portion 122 defines an opening 128 that receives a fastener to couple the fourth portion 122 to the upper jacket assembly 22. The opening 128 is disposed proximate a fourth end 130 of the second energy absorption strap 84. The fourth end 130 of the second energy absorption strap 84 is disposed substantially parallel to but not coplanar with the third end 126 of the second energy absorption strap 84.

During a high-load collapse event both the first energy absorption strap 82 and the second energy absorption strap 84 are rolled to absorb the driver load while the upper jacket assembly 22 translates relative to the lower jacket assembly 20. The high-load collapse event may be an event in which a driver load applied to the steering column assembly 10 exceeds a predetermined load. For example, the predetermined drive load may be greater than 6 kN.

During the high-load collapse event, the first energy absorption strap 82 and the actuator 80 are arranged such that the pin 90 of the actuator 80 is extended and received within the opening 104 of the first portion 100 of the first energy absorption strap 82. As the lower jacket assembly 20 translates relative to the upper jacket assembly 22 during a high-load collapse event, the second portion 102 of the first energy absorption strap 82 translates with the upper jacket assembly 22 relative to the lower jacket assembly 20 and the first portion 100 of the first energy absorption strap 82. The translation of the second portion 102 of the first energy absorption strap 82 relative to the first portion 100 of the first energy absorption strap 82 changes the relative position between the second portion 102 and the first portion 100 while the first portion 100 is held at a substantially constant position by the pin 90 of the actuator 80. The change in relative position between the second portion 102 and the first portion 100 while the first portion 100 is held at a substantially constant position by the pin 90 of the actuator 80 may be referred to as rolling. The rolling aids in providing the drag load or opposing force to at least partially satisfy high-load steering column collapse loads.

Referring to FIGS. 3 and 4, the upper jacket assembly 22 includes an extension portion 140. The extension portion 140 extends away from the steering column axis 12. The extension portion 140 is spaced apart from the telescope drive bracket 50. The extension portion 140 defines an elongated slot 142. The elongated slot 142 extends along a width of the extension portion 140 and is disposed substantially parallel to the steering column axis 12 and the first energy absorption strap 82. During the high-load collapse event a portion of the first energy absorption strap 82 engages the elongated slot 142 of the extension portion 140. As the second portion 102 translates relative to the first portion 100, the engagement of the first energy absorption strap 82 with the elongated slot 142 attempts to maintain the first strap radius of curvature, r1, to inhibit the first strap radius of curvature, r1, from enlarging during the rolling process to inhibit deviation of the energy absorption performance of the energy absorption assembly 26 from the designed load curve.

During a high-load collapse event, the second energy absorption strap 84 is also rolled. As the lower jacket assembly 20 translates relative to the upper jacket assembly 22 during a high-load collapse event, the fourth portion 122 of the second energy absorption strap 84 translates with the upper jacket assembly 22 relative to the lower jacket assembly 20. The translation of the fourth portion 122 of the second energy absorption strap 84 changes the relative position between the fourth portion 122 and the third portion 120 while the third portion 120 is held at a substantially constant position by the fastener coupling the third portion 120 to the telescope drive bracket 50. The change in relative position between the fourth portion 122 and the third portion 120 while the third portion 120 is held at a substantially constant position by the fastener coupling the third portion 120 to the telescope drive bracket 50 may be referred to as rolling. The rolling provides the drag load or opposing force to at least partially satisfy high-load steering column assembly collapse loads. The combination of the rolling of the first energy absorption strap 82 and the second energy absorption strap 84 provides a high-load for supposing translation of upper jacket assembly 22 to satisfy high-load steering column collapse loads.

During a low-load collapse event, only the second energy absorption strap 84 is rolled to absorb the driver load while the upper jacket assembly 22 translates relative to the lower jacket assembly 20. The low-load collapse event may be an event in which a driver load applied to the steering column assembly 10 may not exceed a predetermined load. For example, the predetermined driver load may be less than 7.5 kN.

During the low-load collapse event, the first energy absorption strap 82 and the actuator 80 are arranged such that the pin 90 of the actuator 80 is retracted and the pin 90 of the actuator 80 is not received within the opening 104 of the first portion 100 of the first energy absorption strap 82. As the lower jacket assembly 20 translates relative to the upper jacket assembly 22 during the low-load collapse event, the fourth portion 122 of the second energy absorption strap 84 translates with the upper jacket assembly 22 relative to the lower jacket assembly 20 and relative to the third portion 120 of the second energy absorption strap 84. The translation of the fourth portion 122 of the second energy absorption strap 84 relative to the third portion 120 of the second energy absorption strap 84 changes the relative position between the fourth portion 122 and the third portion 120 while the third portion 120 is held at a substantially constant position by the fastener coupling the third portion 120 to the telescope drive bracket 50. The rolling provides the drag load or opposing force to at least partially satisfy low-load steering column assembly collapse loads.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a lower jacket assembly, extending along a steering column axis;
   an upper jacket assembly at least partially received within the lower jacket assembly, the upper jacket assembly extendable along the steering column axis relative to the lower jacket assembly;
   a telescope actuator assembly configured to translate the upper jacket assembly relative to the lower jacket assembly, the telescope actuator assembly comprising:
      a telescope drive bracket coupled to the upper jacket assembly, and
      a telescope actuator disposed on the lower jacket assembly operatively coupled to the telescope drive bracket;
   an actuator disposed on the telescope drive bracket, having a pin configured to be in an extended position during a collapse event due to a load exceeding a predetermined load and configured to be in a retracted position during a collapse event due to a load not exceeding the predetermined load; and
   a first energy absorption strap having a first portion defining an opening configured to receive the pin and a second portion coupled to the upper jacket assembly; during the collapse event due to the load exceeding a predetermined load the pin is received within the opening.

2. The steering column assembly of claim 1, further comprising a second energy absorption strap having a third portion coupled to the telescope drive bracket and a fourth portion coupled to the upper jacket assembly.

3. The steering column assembly of claim 2, wherein the third portion of the second energy absorption strap is disposed proximate the first portion of the first energy absorption strap and the fourth portion of the second energy absorption strap is disposed proximate the second portion of the second energy absorption strap.

4. The steering column assembly of claim 3, wherein the first energy absorption strap at least partially surrounds the second energy absorption strap.

5. The steering column assembly of claim 3, wherein the second portion has a first strap radius of curvature and the fourth portion has a second strap radius of curvature less than the first strap radius of curvature.

6. The steering column assembly of claim 5, wherein the upper jacket assembly includes an extension portion spaced apart from the telescope drive bracket that receives the telescope actuator.

7. The steering column assembly of claim 6, wherein the extension portion defines an elongated slot disposed substantially parallel to the first energy absorption strap.

8. The steering column assembly of claim 7, wherein during the collapse event due to a load exceeding the predetermined load the first energy absorption strap engages the elongated slot of the extension portion to maintain the first strap radius of curvature as the second portion of the first energy absorption strap translates relative to the first portion of the first energy absorption strap.

9. The steering column assembly of claim 2, wherein during the collapse event due to a load exceeding the predetermined load the second portion of the first energy absorption strap translates relative to the first portion of the first energy absorption strap and the fourth portion of the second energy absorption strap translates relative to the third portion of the second energy absorption strap to provide a force opposing translation of the upper jacket assembly.

10. The steering column assembly of claim 2, wherein during the collapse event due to a load not exceeding the predetermined load the pin is in the retracted position and the fourth portion of the second energy absorption strap translates relative to the third portion of the second energy absorption strap and relative to the first portion of the first energy absorption strap to provide a force opposing translation of the upper jacket assembly.

11. A steering column assembly comprising:
an upper jacket assembly received within a lower jacket assembly;
a telescope actuator assembly configured to translate the upper jacket assembly relative to the lower jacket assembly, the telescope actuator assembly comprising:
a telescope drive bracket coupled to the upper jacket assembly, and
a telescope actuator disposed on the lower jacket assembly and operatively coupled to the telescope drive bracket by a lead screw; and
an energy absorption assembly comprising:
a first energy absorption strap having a first portion defining an opening configured to receive a pin of an actuator disposed on the telescope drive bracket and a second portion coupled to the upper jacket assembly, and
a second energy absorption strap having a third portion coupled to the telescope drive bracket and a fourth portion coupled to the upper jacket assembly.

12. The steering column assembly of claim 11, wherein the telescope drive bracket includes a jackscrew nut that receives the lead screw such that the telescope drive bracket imparts linear motion to the upper jacket assembly from the telescope actuator via the lead screw to translate the upper jacket assembly relative to the lower jacket assembly.

13. The steering column assembly of claim 12, wherein during operation of the telescope actuator assembly, the energy absorption assembly translates with upper jacket assembly as the upper jacket assembly is translated relative to the lower jacket assembly.

14. The steering column assembly of claim 11, further comprising a mounting plate disposed between the telescope drive bracket and the upper jacket assembly, the mounting plate defining a slot configured to receive a fastener to couple the telescope drive bracket to the upper jacket assembly.

15. The steering column assembly of claim 11, wherein during a high-load collapse event due to a load exceeding a predetermined load the second portion of the first energy absorption strap translates relative to the first portion of the first energy absorption strap.

16. The steering column assembly of claim 15, wherein during the high-load collapse event the first energy absorption strap and the pin of the actuator are arranged such that the pin is extended and is received within the opening while the upper jacket assembly moves relative to the lower jacket assembly.

17. The steering column assembly of claim 11, wherein during a low-load collapse event due to a load not exceeding a predetermined load the first energy absorption strap and the pin of the actuator are arranged such that the pin of the actuator is retracted and is not received within the opening.

18. The steering column assembly of claim 17, wherein during the low-load collapse event the fourth portion of the second energy absorption strap translates relative to the third portion of the second energy absorption strap and relative to the second portion of the first energy absorption strap.

19. The steering column assembly of claim 11, wherein the actuator is mounted to the telescope drive bracket.

20. The steering column assembly of claim 11, further comprising a mounting bracket coupled to the lower jacket assembly, the mounting bracket configured to attach the lower jacket assembly to a vehicle structure.

* * * * *